(12) United States Patent
Lestz (10) Patent No.: US 12,557,199 B2
(45) Date of Patent: Feb. 17, 2026

(54) LIGHTING FLEX-LINK SMART SYSTEM FOR SENDING WIRELESS LIGHTING FIXTURE CONTROL SIGNALS TO LIGHTING FIXTURES USING POWER LINE COMMUNICATION (PLC) SIGNALS

(71) Applicant: SPJ Lighting, Inc., South El Monte, CA (US)

(72) Inventor: Paul A. Lestz, Los Angeles, CA (US)

(73) Assignee: SPJ Lighting, Inc., South El Monte, CA (US)

( * ) Notice: Subject to any disclaimer, the term of this patent is extended or adjusted under 35 U.S.C. 154(b) by 166 days.

(21) Appl. No.: 18/357,669

(22) Filed: Jul. 24, 2023

(65) Prior Publication Data

US 2024/0179821 A1    May 30, 2024

Related U.S. Application Data

(60) Provisional application No. 63/427,906, filed on Nov. 24, 2022.

(51) Int. Cl.
*H05B 47/185* (2020.01)
*H05B 47/19* (2020.01)

(52) U.S. Cl.
CPC .......... *H05B 47/185* (2020.01); *H05B 47/19* (2020.01)

(58) Field of Classification Search
CPC ....... H05B 47/185; H05B 47/19; H05B 45/20
USPC ........................................... 315/291
See application file for complete search history.

(56) References Cited

U.S. PATENT DOCUMENTS

| | | | | |
|---|---|---|---|---|
| 7,233,115 | B2 | 6/2007 | Lys | |
| 7,256,554 | B2 | 8/2007 | Lys | |
| 7,777,427 | B2* | 8/2010 | Stalker, III | H05B 47/185 315/307 |
| 8,768,493 | B2* | 7/2014 | Souvay | H05B 47/185 700/83 |
| 9,100,999 | B2* | 8/2015 | Li | H05B 47/185 |
| 9,370,073 | B2* | 6/2016 | Pi | H05B 45/22 |
| 9,699,862 | B2* | 7/2017 | Campbell | H05B 47/185 |
| 11,394,426 | B2* | 7/2022 | Kearney | H05B 47/185 |
| 11,523,488 | B1* | 12/2022 | Recker | H05B 47/105 |
| 11,917,740 | B2* | 2/2024 | Woytowitz | H05B 45/20 |

(Continued)

*Primary Examiner* — Ryan Jager
(74) *Attorney, Agent, or Firm* — SoCal IP Law Group LLP; Angelo J. Gaz (57) ABSTRACT

A master control unit (MCU) is adapted to send wireless lighting fixture control signals to lighting fixtures using wired power line control (PLC) signals. The MCU has: an MCU power controller coupled through power lines for sending illumination power to the lighting fixtures; a command receiver for receiving from an input device, a modulated command signal having lighting fixture commands for the of lighting fixtures; a demodulator for demodulating the modulated command signal to obtain the lighting fixture commands; a wireless encoder for encoding the lighting fixture commands into wireless lighting fixture control signals for the lighting fixtures; a PLC modulator for converting the wireless lighting fixture control signals for the lighting fixtures into PLC lighting fixture control signals; and a power and PLC transmitter for sending the PLC lighting fixture control signals and the illumination power to each of the lighting fixtures using the wired power lines.

20 Claims, 5 Drawing Sheets

(56) References Cited

U.S. PATENT DOCUMENTS

| | | | | |
|---|---|---|---|---|
| 2013/0249429 A1* | 9/2013 | Woytowitz | ............ | H05B 47/165 |
| | | | | 315/246 |
| 2013/0270998 A1* | 10/2013 | Pi | ........................... | H05B 45/22 |
| | | | | 315/51 |
| 2013/0289750 A1* | 10/2013 | Souvay | ................ | H05B 47/185 |
| | | | | 700/90 |
| 2013/0293155 A1* | 11/2013 | Campbell | ............ | H05B 47/105 |
| | | | | 315/307 |
| 2018/0092190 A1* | 3/2018 | Range | .................... | H05B 45/10 |
| 2019/0045594 A1* | 2/2019 | Lester | ................... | H05B 47/115 |
| 2022/0201827 A1* | 6/2022 | Vulej | ................. | H05B 47/1965 |
| 2023/0007755 A1* | 1/2023 | Wang | .................. | H05B 47/105 |
| 2024/0179821 A1* | 5/2024 | Lestz | .................. | H05B 47/185 |

\* cited by examiner

301 Process flow

LIGHTING FLEX-LINK SMART SYSTEM FOR SENDING WIRELESS LIGHTING FIXTURE CONTROL SIGNALS TO LIGHTING FIXTURES USING POWER LINE COMMUNICATION (PLC) SIGNALS

RELATED APPLICATION INFORMATION

This patent claims priority from U.S. Provisional Patent Application No. 63/427,906, titled, LIGHTING FLEX-LINK SMART SYSTEM, filed Nov. 24, 2022 of which are hereby incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The disclosure relates to systems and processes for sending lighting fixture control signals to lighting fixtures, such as controllers sending lighting fixture control signals to outdoor landscape lighting fixtures.

Description of the Related Art

Various types of artificial light fixtures are currently used in home, business, landscape, pool, common carrier, motion picture and television fields. Systems and processes are used to control light produced by lights of the fixtures so that the resulting illumination of an area or scene is what a user of the light desires. One goal of the present systems and processes is to send lighting fixture control signals from a controller to lighting fixtures so that lights of the fixtures illuminate a scene to appear to a human viewer to have the brightness, color and other lighting factors desired.

However, conventional lighting fixture control signal sending technologies suffer from several problems. Those problems include the need for additional electrical equipment at each fixture that adds significant cost to each fixture. The additional equipment also requires more space, power and adds failure points to each fixture. In some cases, the additional equipment increases the chance for moisture or water to leak into the fixture. The additional equipment may also not be aesthetically attractive, such as when it requires a certain shape of or feature on the outside housing of the fixture.

Throughout this description, elements appearing in figures are assigned three-digit or four-digit reference designators, where the two least significant digits are specific to the element and the one or two most significant digit is the figure number where the element is first introduced. An element that is not described in conjunction with a figure may be presumed to have the same characteristics and function as a previously-described element having the same reference designator or the same two least significant digits.

DETAILED DESCRIPTION

Technologies described herein provide systems and methods for sending lighting fixture control signals to lighting fixtures. For example, a wireless lighting system control system may have a radio frequency "RF" chip in each fixture, such as for communicating using Wi-Fi, Bluetooth, 900 MHz signals, etc. The downsides are that this adds significant cost to each fixture and requires each fixture to have an RF antenna. For plastic fixtures or fixtures with a plastic "window" opening (like on the side or camera on a back of a mobile phone) this may present fewer problems, such as to manufacture and seal from moisture or water. For metal, alloy or brass housed landscape fixtures (which have housings that block RF, Wi-Fi and/or blue tooth signals) adding a plastic window through which to receive the RF, Wi-Fi and/or Blue tooth signal is difficult to manufacture, may not be waterproof and may not be aesthetically attractive.

The applied for technologies also include systems and methods for sending wireless lighting fixture control signals to lighting fixtures using wired power line communication (PLC) signals. For example, an App (e.g., a mobile device application) may send wireless (e.g., RF) signals having lighting fixture commands to one master control unit (MCU). The MCU may be a single controller for a number of light fixtures. The one MCU converts the commands into wired signals and sends those wired signals to each of, for example, 30 lighting fixtures using wired PLC signals transmitted on the wired power lines that provide electrical power to each fixture. Then each fixture uses the PLC signals to control lights such as LEDs of the fixture.

The MCU may not transmit wireless (e.g., RF) signals; and the fixtures may not have wireless signal receivers or transparent windows in their housing at which wireless signals are received or through which the wireless signals travel.

In some cases, the technologies include a PLC design combined with the MCU design for outdoor landscape lighting fixtures. The lighting fixtures may have a metal and/or alloy outer housing. The housing may be brass. The PLC controls may be for multiple lighting fixtures with a few simple MCU commands, up to as complex as complicated MCU commands (e.g., illumination. commands) for up to 30 or more lighting fixtures of a landscape system. The commands may be uniform for a group of lighting fixtures or may be independently addressed or otherwise identified with a particular fixture to provide unique lighting characteristics for each fixture.

The technologies herein can be applied to lighting controllers and/or fixtures including those in home, business, landscape, pool, common carrier, motion picture and television fields. The controllers and/or lighting fixtures can be for a patio, gazebo, pergola, indoor room, etc. The light or lights of a fixture may be one or more devices, such as one or more of a complete light source, a light emitting device, a light bulb (incandescent, florescent, etc.) and/or a light emitting diode (LED).

Description of Apparatus

Figure 1:
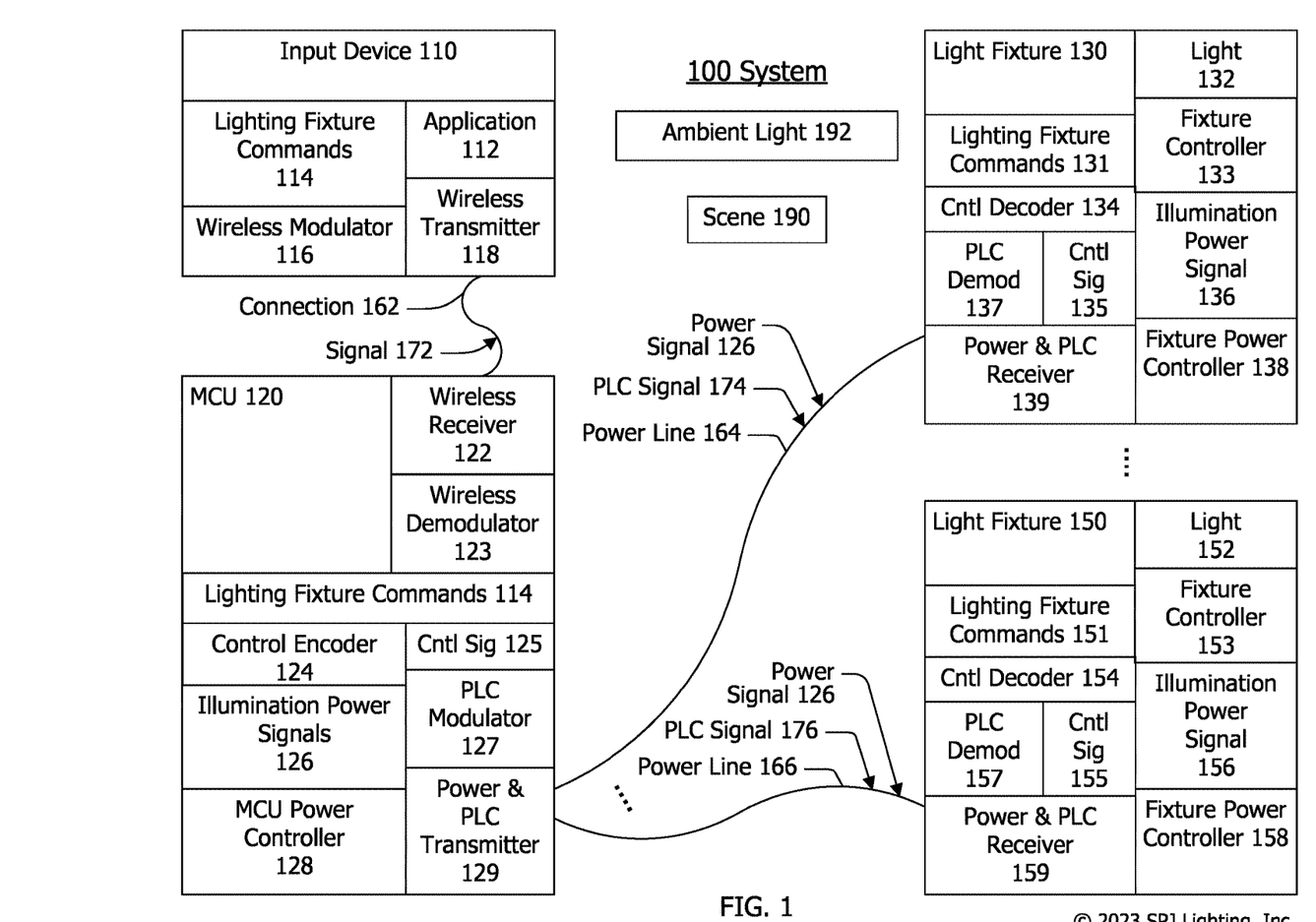
FIG. 1 is a block diagram of a system for sending wireless lighting fixture control signals to lighting fixtures using power line communication (PLC) signals.

Referring now to FIG. 1, there is shown a block diagram of a system 100 for sending wireless lighting fixture control signals to lighting fixtures using PLC signals. System 100 being "for" performing an action may mean that is system 100 is configured to and/or adapted to perform that action. For instance, system 100 being "for" sending may mean that is system 100 is configured to and/or adapted to send the PLC signals using a PCL protocol. The system 100 has input device 110 connected through connection 162 to MCU 120. MCU 120 is connected through wired power lines 164 through 166 to light fixtures 1 through N, respectively.

Input Device 110 may be a purpose-built or universal remote control with hardware or software functions, a mobile device, a cell phone, a mobile phone, a laptop computer, a desktop computer or another computing device. Input Device 110 may be or include a computing device as described at FIG. 4. Device 110 includes application 112, lighting fixture commands 114, wireless modulator 116 and wireless transmitter 118, each of which may be components and/or circuitry of device 110. Each may be connected to all the other of the of the components and circuitry. The input device 110 can have a combination of encoders, buttons, displays, graphical user interfaces (GUIs) and/or a touchscreens that are used by the user to make inputs to application 112, such as to generate lighting fixture commands 114.

Application 112 may be an application (e.g., running and stored within in a remote control, a mobile phone, laptop, desktop or other computing device) or other program for controlling the fixtures. It may be circuitry as described herein. It may be software running on device 110. Application 112 may include and generate lighting fixture commands 114. Application 112 may allow a user to set the commands 114 for the lights of fixtures 130-150. Application 112 may be cloud based, such as a cloud based website.

The Application 112 may be an input device application on input device 110 that has a GUI that allows a user to input the lighting fixture commands and optionally to input an integer that represents is the number of light fixtures to be controlled. The application 112 can have a GUI that allows the user to set and view the commands 114 via a combination of encoders, buttons, display and/or a touchscreen.

The view of the commands 114 can include viewing of the commands 114 as a selected number in a range of numbers for a single, multiple or all fixtures. The view may show a color graphical representation of the output of the lights based on the commands and/or the fixtures lighting of a scene 190 such as an outdoor landscape that will result from the currently selected commands to the fixtures. Commands 114 may include a current amount of daylight or ambient light 192 existing when the user inputs the commands. Thus, there may be a difference in commands 114 between the illumination (e.g., brightness, color, dim etc.) desired/input by the user and the ambient light 192. Color may be or include color temperature, saturation, hue, and/or tint. Modern LED lights typically used in such fixtures are capable of millions of distinct colors and other systems enable precise selection of color, temperature, saturation, hue, and/or tint. Though versatile and inexpensive, the use of LED lights is not a requirement.

The lighting fixture commands 114 include commands to each of fixtures 130-150 to command each of the lights of those fixtures. Commands 114 may include one, two, three or up to 30 commands for each of the fixtures. The commands may include illumination (e.g., brightness, color, dim, flash, etc.) commands to control the illumination brightness and color of each light of each of the fixtures. The illumination commands may include brightness, color, dimming, flashing (e.g., period of periodic flashing), timed turning on, timed turning off and the like commands to control each light of each of the fixtures.

The wireless modulator 116 may be a modulator for modulating the commands 114 such as with a wireless or RF carrier signal to form the wireless modulated signal 172 to be transmitted on connection 162.

The wireless transmitter 118 may be a wireless transmitter for transmitting the wireless modulated signal 172 on connection 162 to MCU 120 or wireless receiver 122. The wireless transmitter 118 may be or include one or more of an RF chip, an RF antenna and/or an RF transparent (e.g., plastic) window for transmitting wireless signals from the input device 110 to the MCU wireless receiver 122.

Connection 162 may be a wireless connection such as a cell, 802.11x WiFi, RF, Bluetooth® etc. connection from the input device 110 to the MCU 120. Connection 162 may be for and modulated signal 172 may be sent by one of: radio frequency (RF) signals, Wi-Fi signals, Bluetooth® signals, and/or 900 MHz signals. Signal 172 is transmitted on connection 162 from device 110 to MCU 120, such as using a wireless signal or RF technology.

Those commands 114 may be sent by the input device 110 on connection 162 to the MCU 120. Input device 110 may not have the ability to send commands 114 directly to fixtures 130-150, without the use of MCU 120. The commands 114 are provided by MCU 120 through wired power lines 164-166 to the fixtures 130-150 using PLC signals 174-176. Other hardware and/or software could be used for the input device 110 and/or application 112, such as a capacitive or resistive touch screen, knobs, switches or potentiometers. Purpose-built remote controls with such hardware and/or software may be used in some implementations.

Master control unit (MCU) 120 may be a controller for (e.g., adapted to and/or configured for) controlling lighting fixtures 130-150 including by sending PLC modulated versions 174-176 of wireless encoded versions 125 of commands 114 to fixtures 130-150. MCU 120 may be one controller or have one chip for sending wired lighting fixture control signals to lighting fixtures using PLC signals. The MCU 120 includes wireless receiver 122, wireless demodulator 123, lighting fixture commands 114, wireless control protocol encoder 124, wireless encoded lighting fixture control signals 125, PLC modulator 127, illumination electrical power 126, MCU power controller 128 and power and PLC transmitter 129, each of which may be components and/or circuitry of MCU 120. Each may be connected to all the other of the of the components and circuitry of MCU 120. The MCU electronic circuitry may include logic circuitry for automatically and simultaneously transmitting the PLC signals 174-176 and the illumination power signals 126 to the fixtures 130-150 over the power lines 164-166. MCU 120 may be or include a computing device as described at FIG. 4.

The wireless receiver 122 may be a wireless receiver for receiving the wireless modulated signal 172 on connection 162 from device 110 or wireless transmitter 118. The wireless receiver 122 may be or include one or more of an RF chip, an RF antenna and/or an RF transparent (e.g., plastic) window for receiving wireless signals from the input device 110.

The wireless demodulator 123 may be a demodulator for demodulating commands 114 such as from a wireless or RF carrier signal of the wireless modulated signal 172 received from connection 162 to form the commands 114.

Connection 162 and signal 172 do not need to be wireless. Receiver 122 may be a command receiver for receiving command signals 172 having commands 114 from input device 110 which could be a hardware device or a mobile phone (or both). Connection 162 may be a wired connection and input device 110 sends commands 114 to the MCU 120 using a wired signal. Here, transmitter 118 and receiver 122 may be for wired signals having commands 114 which may or may not be modulated.

In some cases, the ability of device 110 and/or application 122 is part of MCU 120. Here, commands 114 can be created by or at MCU 120.

The lighting fixture commands 114 include at least one command to each of fixtures 130-150 to command each of the lights of those fixtures, such as noted when describing device 110. Any number of lighting fixtures 130-150 may be incorporated into this design. Each of the fixtures 130-150 may be physically connected or wired to the MCU 120 using a spoke-hub, star or daisy-chain connection. Each of fixtures 130-150 may be separately connected to the MCU 120 by power lines like power lines 164, 166. In other cases, the fixtures 130-150 may be connected to the MCU 120 in a daisy-chain fashion such as with line 164 to the first or proximate (to the MCU in the daisy chain) fixture 130, a power line similar to line 164 from the first fixture to a second fixture (not shown) to provide power and PLC signals to the second fixture, and the like until there is a power line similar to line 164 from the second to final or distal end fixture (from the MCU in the daisy chain) to the end fixture 150 to provide power and PLC signals to the end fixture 150. The daisy chain power line may represent one or more power lines such as found in some holiday lights. In another case, the fixtures 130-150 may be connected both separately and in a daisy-chain fashion. In any of these cases, each fixture receives power signals and PLC signals from at least one power line such as line 164 or 166.

The wireless encoder 124 is for encoding the commands 114 into a wireless control protocol's wireless lighting fixture control signals 125 for each of the lighting fixtures 130-150. The wireless control protocol may be a lighting fixture control signal protocol used for controlling lights, lighting and/or light fixtures, such as fixtures 130-150. The protocol may be for controlling power to fixtures or devices other than lights. It may be or include one or more of the following: TCP/IP, IEEE 802.11, ZigBee, a protocol defined by the IEEE 802.15.4 specification, Digital Addressable Lighting Interface (DALI), DALI's wireless extension, a protocol defined in the IEC60929 specification, Xbee, EnOcean, Bluetooth, Bluetooth LE, Synapse Network Appliance Protocol (SNAP), Bluetooth Mesh, a proprietary protocol which is similar to ZigBee, and the like.

Wireless encoder 124 may encode each of the commands of commands 114 into at least one wireless lighting fixture control signal of signals 125 for each of at least two of the lighting fixtures 130-150. Wireless encoder 124 may compress multiple commands of commands 114 for a fixture into a single wireless signal for a fixture, then strip apart the wireless signals for each fixture and send them to their respective lighting fixtures. It may encode commands 114 into wireless signals for at least two of the lighting fixtures.

The wireless signals 125 are wireless versions of or wireless signals based upon command signals 114. The wireless signals 125 may be designed to eliminate the need for continuous operator attention, by automatically adjusting some variable to hold the measurement (or process variable) at the set-point. The wireless encoder 124 may automatically adjust signals 125 based on a difference or error in the actual amount of ambient light 192 in the setting and the desired difference between illumination (e.g., brightness and color) output by each of the fixtures 130-150 desired in commands 114 and the amount of ambient light used for or sent with commands 144. The actual amount of ambient light may be measured by a light sensor (not shown) on the MCU and/or one or more fixtures 130-150. That is the wireless encoder may adjust signals 125 over time according to a changing error between the actual amount of ambient light in the setting and the amount of ambient light used for or sent with commands 144 each of the fixtures 130-150.

Signals 125 can be adjusted when the ambient light 192 decreases and increases so that the difference between illumination (e.g., brightness and color) output by lights of the fixtures stays and the measured actual ambient light the same as it is in the difference in illumination commands 114 between the illumination (e.g., brightness and color) desired and input by the user and the ambient light of commands 114 (e.g., used when the user generates commands 114).

In some cases, encoder 124 use a wired control signal protocol. In some cases, encoder 124 uses proportional integral derivative control as or in signals 125. Wireless encoder 124 may automatically compute the output values of signals 125 as the sum of the following three values at a point in time t: Proportional term: take the error at a point in time t and multiply it by a constant Kp; Integral term: take the cumulative total error at a point in time t and multiply it by a constant Ki; and Derivative term: take the rate of change in error at a point in time t and multiply it by a constant Kd.

Wireless encoder 124 may add all three of the above values together to produce the final output u for that cycle and send it as signals 125 to each fixture. The wireless encoder 124 may add the three together using the following formula:

$$u(t) = K_p e(t) + K_i \int_0^t e(\tau)d\tau + K_d \frac{d}{dt} e(t)$$

Where u(t) is the drive coming from the wireless encoder 124, into the signals 125, at time t; e(t)=ysp(t)−y(t) is the difference between the setpoint and measured process variable at time t; and Kp, Ki, Kd are the respective P, I, and D constants.

The wireless encoder 124 may automatically adjust signals 125 based on other variables, measurements and/or set-points.

Power line communication (PLC) modulator 127 is for converting the wireless light control signals 125 into a PLC lighting fixture control signals 174-176 for sending to each of the lighting fixtures 130-150 across power lines 164-166, respectively. Power-line communication may also be known as power-line carrier or PLC. Control signals 174-176 carry data on wired power lines 164-166 that are each also used simultaneously for electric power (e.g., AC and/or DC power) transmission or electric power distribution to fixtures 130-150, respectively. Modulator 127 may convert at least one wireless lighting fixture control signal for each of at least two of the lighting fixtures into at least two PLC lighting fixture control signals for sending to at least two of the of lighting fixtures.

PLC modulator 127 may add the same or a different modulated carrier signal to each of the power lines 164-166. Each modulated carrier signal may have a carrier signal waveform of a different frequency than that of any AC power on the power line having that carrier signal. Each modulated carrier signal is a waveform (usually sinusoidal) that is modulated (modified) with one of the wireless light control signals 125 for a fixture (an information-bearing signal) for the purpose of conveying the information of the wireless light control signal 125 to the fixture. This carrier waveform may have a much higher frequency than the wireless light control signal 125. This carrier waveform may have a much higher frequency than any AC power being sent on the power line to the fixture. The frequency being much higher may be between 10× and 1E6×; between 100× and 10,000×; or between 10× and 1,000×. For daisy-chain connections from the MCU 120 to the fixtures, PLC modulator 127 may add the same or a different modulated carrier signal to the daisy-chain power line.

Control signals 174-176 have the carrier signal modulated with the wireless light control signals 125 to be sent on each of the power lines 164-166, respectively. PLC modulator 127 may use a PLC protocol and/or modulation of the control signals 125 to send them piggybacked on the power signals from MCU power controller 128. The modulation schemes used in PLC may be Orthogonal Frequency Division Multiplexing (OFDM), Binary Phase Shift Keying (BPSK), Frequency Shift Keying (FSK), Spread-FSK (S-FSK) and proprietary schemes too (like the Differential Code Shift Keying (DCSK)).

Illumination electrical power signals 126 are the electrical power to be sent on the power lines 164-166 to each of the fixtures 130-150 to enable them to illuminate, respectively. Signals 126 may be AC and/or DC illumination electrical power sent to receivers 139-159 and fixture power controllers 138-158 of lighting fixtures 130-150, respectively. The power signals 126 can be the same or different for each of the fixtures. The signal(s) 126 can be any one or more of 3, 5, 6, 10, 15, 20, 25 or 40 volts. The signal(s) can include AC and/or DC.

MCU power controller 128 is for sending illumination electrical power signals 126 to each of fixtures 130-150 through power lines 164-166, respectively. MCU power controller 128 sends illumination electrical power 126 to power controllers 138-158 of each of fixtures 130-150, respectively. MCU power controller 128 is connected through transmitter 129 to power lines 164-166, and thus is coupled to the power lines.

Power and PLC transmitter 129 is for sending the PLC lighting fixture control signals 174-176 and the illumination electrical power signals 126 to each of the lighting fixtures 130-150 using each of the power lines 164-166, respectively. That is transmitter simultaneously sends one of PLC lighting fixture control signals 174-176 and one of the illumination electrical power signals 126 together on each of the power lines 164-166.

Power lines 164-166 may each be a power connection, a wire, a power wire and/or a conductive power signal path electrically connecting transmitter 129 to receivers 139-159, respectively. Power lines 164-166 may each be power lines, wires and/or cables that provide direct current (DC) and/or alternating current (AC) power to the light fixtures to power the any electrical circuitry of the fixtures and/or light of the fixtures. Each of power lines 164-166 simultaneously carry one of PLC lighting fixture control signals 174-176 and one of the illumination electrical power signals 126 from the transmitter 129 to a receiver 139-159, respectively. The MCU power controller 128 is coupled through of power lines 164-166 to fixtures the fixtures so that the power lines can send illumination electrical power signals 125 to fixture power controllers 138-158. The power lines 164-166 are shown connected directly to the MCU 120, however in some cases the power lines 164-166 may be daisy-chained between the light fixtures 130-150.

Light fixtures 130-150 may be n light fixtures controlled by and connected to MCU 120 through power lines 164-166. The number of light fixtures n may be between 10 and 200 lighting fixtures. It may be between 10 and 100, It may be between 20 and 40. Light fixtures 130-150 may be landscape system lighting fixtures.

Light fixtures 130-150 may be lighting fixtures for (e.g., adapted to and/or configured for) using PLC lighting fixture control signals 174-176 to illuminate scene 190 such as a landscape or other area external to the fixtures. One or more of the fixtures 130-150 may also have a sensor (not shown) to measure ambient light 192. Light fixtures 130-150 may each have one chip for using PLC modulated versions 174-176 of wireless encoded versions 125 of commands 114 at fixtures 130-150.

Light fixture 130 includes power and PLC receiver 139, PLC demodulator 137, wireless signals 135, wireless decoder 134, lighting fixture commands 131, illumination electrical power signal 136, fixture power controller 138, fixture controller 133 and light 132, each of which may be components and/or circuitry of fixture 130. Each may be connected to all the other of the of the components and circuitry of fixture 130. Fixture 130 may be or include a computing device as described at FIG. 4.

PLC receiver 139 may be a fixture power and PLC receiver for receiving PLC lighting fixture control signal 174 and illumination electrical power signal 126 sent by the power and PLC transmitter 129 using power line 164. PLC receiver 139 may simultaneously receive signal 174 and signal 126 on or from power line 164.

PLC demodulator 137 may be a PLC demodulator for converting the PLC lighting fixture control signal 174 to the wireless lighting fixture control signal 135. PLC demodulator 137 may demodulate wireless light control signal 135 received on power line 164 from the carrier waveform of control signals 174-176. PLC demodulator 137 can select the proper signal 174 for fixture 130. PLC demodulator 137 can select the proper signal 135 from wireless light control signals 125 received on power line 164.

The wireless signal 135 is the wireless signal of signals 125 for fixture 130. The wireless signal 135 is a wireless version of or wireless signal based upon signal 131 for fixture 130 of control signals 114.

Wireless decoder 134 may be a wireless decoder for decoding the wireless lighting fixture control signal 135 to lighting fixture command 131 for fixture 130. wireless decoder 134 may decode lighting fixture command 131 from wireless light control signals 125 received on power line 164. wireless decoder 134 can select the proper commands 131 from commands 114 for fixture 130.

The lighting fixture commands 131 includes commands for fixtures 130 to command the light of fixture 130, such as noted when describing device 110.

Illumination electrical power signal 136 is the power signal of signals 126 received on the power line 164 by fixture 130. Signals 136 may be AC and/or DC; and can be any one or more of 3, 5, 6, 10, 15, 20, 25 or 40 volts as noted for signals 126.

Fixture power controller 138 may be a fixture power controller having a power line 164 connection with the MCU 120 or MCU power controller 128 for receiving illumination electrical power signal 136 from the MCU power controller.

Fixture controller 133 may be a fixture controller (e.g., an IC chip) for controlling light 132 of the fixture according to the lighting fixture commands 131 and using the received illumination electrical power signal 136.

Light 132 may be the at least one light, such as a landscape light, for illuminating a scene 190 according to the control of the fixture controller 133. The light 132 or lights of a fixture may be one or more devices, such as one or more of a complete light source, a light emitting device, a light bulb (incandescent, florescent, etc.) and/or a light emitting diode (LED). Light 132 may include an LED driver and at least one LED for illuminating the scene 190 based on the LED driver.

There may be different types of lights in different ones of the fixtures, thus creating different types of fixtures. The different types of lights may be different by having different color, dimness, flash ability, etc.

There may be a separate wireless signal or set of wireless signals sent by the MCU 120 in the PLC signals 174-176 to or for each of fixtures 130-150. The separate wireless signal or set of wireless signals may be a subset of signals 125, such as by being the wireless signals 135-155. The signal or set of wireless signals may be sent by the MCU 120 (e.g., in PLC signals 174-176) upon the power lines 164-166 to each fixture. The separate wireless signal(s) sent to each fixture 130-150 may have a distinct encoding for each fixture, such as based on a fixture identification—ID (not shown). The fixture ID may be unique for each of fixtures 130-150. Each fixture's wireless decoder 134-154 can select the proper wireless signal(s) for that fixture based on the fixture ID. The MCU 120 or wireless encoder 124 may put or add the distinct encoding to the separate wireless signal(s) for each fixture.

The multiple wireless signals 125 may be stored a data in memory of the MCU. The memory may be part of the RF chip (not shown) or wireless encoder 124. The RF chip may be part of, all of, or include more than MCU 120. The memory may be shown as wireless signals 125.

There may be a separate wireless signal 135-155 for each fixture. There may be multiple separate wireless signals as each of signal 135-155. Each of the separate wireless signals may be to control color change, dim, flash, etc. signals/commands for each fixture.

In some cases, the wireless signals 135-155 are too much data to send immediately via the PLC signals 174-176 to the fixtures. In this case, the wireless signals 135-155 may be spit across two or more of the PLC signals 174-176 sent to the fixtures. Signals 135-155 may be spit across between two and 20, two and 10 or two and five of signals 174-176.

The MCU 120 or PLC modulator 127 may send the wireless fixture commands 114 (e.g., as wireless signals 125) to up to 30 fixtures via a PLC signal 174-176 piggybacked on a 12 volt AC or 15 volt AC power lines 164-166. Alternatively, or in addition to using power lines 164-166, the PLC signal 174-176 may be piggybacked on a 12 volt AC or 15 volt AC power line 164 that is run in daisy-chain fashion. There may be a separate PLC signal 174-176 sent by the MCU 120 to or for each of fixtures 130-150. All or only the separate PLC signal 174-176 may be sent by the MCU 120 upon the power lines 164-166 to each fixture. The separate PLC signal sent to each fixture 130-150 may have a distinct encoding for each fixture, such as based on the fixture ID. Each fixture's PLC demodulator 137-157 can select the proper PLC signal for that fixture based on the fixture ID. The MCU 120 or PLC modulator 127 may put or add the distinct modulation to the separate PLC signal for each fixture.

The PLC signal 174-176 may be for multiple lighting fixtures with a few simple MCU commands 131-151, up to as complex as complicated MCU commands 131-151 (e.g., brightness and color commands) for up to 30 or more lighting fixtures of a landscape system.

Using the PLC signals negates the need for a wireless antenna on the fixtures and/or an RF chip at the fixtures 130-150. In some cases, the fixtures do not have a wireless chip, they utilize a wireless decoder 134-154 and/or PLC demodulator 137-157 to manipulate the LED light output by lights 132-152.

In some cases, the fixtures also use an LED driver (not shown but part of each fixture) to manipulate the LED light output by LED versions of lights 132-152. The LED driver may be part of controller 133-153 and/or lights 132-152. The LED driver may manipulate the LED light output by lights 132-152 by manipulating the LED color change, dim, flash, etc. of the LED or LEDs of the fixture 130-150 by altering the signals creating/controlling those lighting aspects of the LEDs. There may be different color LEDs or LEDs capable of multiple color illumination that are controlled by the LED driver in the fixture.

In this case, commands 114 may be LED commands (color change, dim, flash, etc. signals) sent to the receiver 122 (e.g., RF chip of the MCU 120), encoded as wireless signals 125 that are converted to the PLC signals 174-176 for each fixture 130-150 by the MCU 120 or modulator 127 and sent as PLC signal commands (e.g., wireless signals 135-155) to each fixture by the MCU 120. The sent PLC signals 174-176 are converted back from PLC to wireless signals 135-155 by demodulators 137-157; and the wireless signals are decoded by the wireless decoder 134-154 of each fixture. The demodulators 137-157 and decoders 134-154 may be on a PLC decode chip of each fixture 130-150. The LED drivers may be in LED "modules" that then provide the illumination desired for each fixture (or fixture type) based on the received wireless decoded signal 135-155 for that fixture.

The MCU 120 may send a PLC and/or wireless coded signal to all fixtures so that either "all" fixtures or an individual/specific fixture ID receives the commands 131-135 and manipulates the lights 132-152. The APP 112 can assign the fixture ID to each fixture through power lines 164-166 (and/or daisy-chain power line), a temporary wired or other connection between each fixture 130-150 and the MCU 120.

The wireless encoder 124 and/or PLC modulator 127 may be for sending all of the PLC lighting fixture control signals 174-176 each with all of the wireless lighting fixture control signals 125 to each of the lighting fixtures 130-150 along with signals 126 using a separate one of the power lines 164-166 (and/or all the PLC signals along one daisy-chain power line). In this case, PLC receiver 139 may simultaneously receive all of PLC lighting fixture control signals 174-176 and one of the illumination electrical power signals 126 together on power line 164. In this case, PLC demodulator 137 can select the proper signal 174 and/or signal 135 for fixture 130. Or wireless decoder 134 can select the proper signal 135 or commands 131 for fixture 130.

The wireless encoder 124 and/or PLC modulator 127 may be for sending only one of all of the PLC lighting fixture control signals 174-176 each with all of the wireless lighting fixture control signals 125 to each of the lighting fixtures 130-150 along with signals 126 using a separate one of the power lines 164-166. In this case, PLC receiver 139 may simultaneously receive signal 174 and one of signals 126 together on power line 164. In this case, PLC demodulator 137 can select the proper signal 135 for fixture 130; or wireless decoder 134 can select the proper signal 135 or commands 131 for fixture 130.

The wireless encoder 124 and/or PLC modulator 127 may be for sending all of the PLC lighting fixture control signals 174-176 each with only the wireless lighting fixture control signals 125 for each of the lighting fixtures 130-150 along with signals 126 using a separate one of the power lines 164-166 (and/or all the PLC signals along one daisy-chain power line). In this case, PLC receiver 139 may simultaneously receive all of PLC lighting fixture control signals 174-176 and one of the illumination electrical power signals 126 together on power line 164. In this case, PLC demodulator 137 can select the proper signal 174 having only the wireless lighting fixture control signals 125 for fixture 130.

The wireless encoder 124 and/or PLC modulator 127 may be for sending only one of all of the PLC lighting fixture control signals 174-176 each with only the wireless lighting fixture control signals 125 for each of the lighting fixtures 130-150 along with signals 126 using a separate one of the power lines 164-166. In this case, PLC receiver 139 may simultaneously receive PLC lighting fixture control signal 174 and one of the illumination electrical power signals 126 together on power line 164. In this case, PLC demodulator 137 receives only the proper signal 174 having only the wireless lighting fixture control signals 125 for fixture 130.

Light fixture 150 includes power and PLC receiver 159, PLC demodulator 157, wireless signals 155, wireless decoder 154, lighting fixture commands 15, illumination electrical power signal 156, fixture power controller 158, fixture controller 153 and light 152, each of which may be components and/or circuitry of fixture 150. Each may be connected to all the other of the of the components and circuitry of fixture 150. Fixture 150 may be or include a computing device as described at FIG. 4.

Each of the components and/or circuitry of fixture 150 may be the same as that of fixture 130, except they are the components and/or circuitry of fixture 150 and produce illumination of scene 190 using light 152 according to commands 151 from signals 155 and 176.

In some cases, the components and/or circuitry of MCU 120 and fixtures 130-150 is electronic circuitry, such as including PCB, transistors, resistors, capacitors, inductors, traces, ICs, chips, ROM and/or other hardware circuitry that perform the functions described. In some cases, they are computer logic, computer chips, a computer chip, computer circuitry and/or computer hardware. In some cases, they are hardware logic and software.

In some cases, the components and/or circuitry of MCU 120 may be or include an RF chip, hardware and/or a fabricated IC chip. The components and/or circuitry of MCU 120 may be or include ROM (e.g., a BIO chip). They may include software. They may use a combination of a prefabricated chip, ROM and/or software.

The wireless encoder 124 and decoders 134-154 may be implemented by hardware, ROM and/or software as noted above for the MCU. The PLC modulator 127 and demodulators 137-157 may be implemented by hardware, ROM and/or software as noted above for the MCU. The RF chip implementation at the MCU 120 may be a combination of the RF chip, encoder 124 and the modulator 127.

The system 100 may use one MCU "hub" 120 with one chip at the hub and the fixtures 130-150 use a simple PLC "decoder" or demodulator 137-157 which reduces or removes costs of multiple RF chips/converters for all the fixtures 130-150. Commands 131-151 are sent by wire or power lines 164-166, not wirelessly. This system 100 may use only one single Wi-Fi/BLE "chip" at MCU 120 to receive signals 172.

In this case, a customized APP 112 may send multiple fixture commands 114 to the RF chip of MCU 120 to be encoded into PLC signals 174-176 having wireless signals 135-155 of commands 131-151 sent on the power lines 164-166 that power each fixture with power signals 126. The MCU 120 may use a chip and an RF 2.4 GHz antenna which receives multiple signals 172 from the APP 112 and/or the cloud for up to 30 fixtures.

Here, the MCU 120 converts the RF signal 172 received into multiple wireless signals 135-155. The wireless signals are the fixture control signals and may be sent to the fixtures using PLC signals 174-176. There may be a separate PLC signal for each fixture, such as send upon the power wire to that fixture. The separate PLC signals 174-176 may have a distinct encoding or modulation for each fixture 130-150, such as based on a fixture ID.

The lighting fixtures 130-150 may each have outer housing (not shown). The housing may be metal and/or alloy. The housing may be brass. The components and/or circuitry of fixtures 130-150 may be completely contained within the housing of each fixture. The housing may be completely or mostly metal, such as aluminum, brass or a metal that rusts slowly if at all. The housing may significantly or totally block RF signals from entering the fixture. The fixture housing may not be RF transparent but a housing of MCU 120 may be RF transparent to receiver wireless signals 172 from App 112 or device 110.

The fixture and housing may not have or may exclude an RF chip, an RF antenna and an RF transparent (e.g., plastic) window for receiving wireless signals. In some cases, they exclude a window except possibly where the light 132 is located. There may be no wired or wireless connections to the fixtures from the MCU other than the power lines. There may be no wired or wireless connections to the fixtures at all other than the power line to that fixture.

Figure 2:
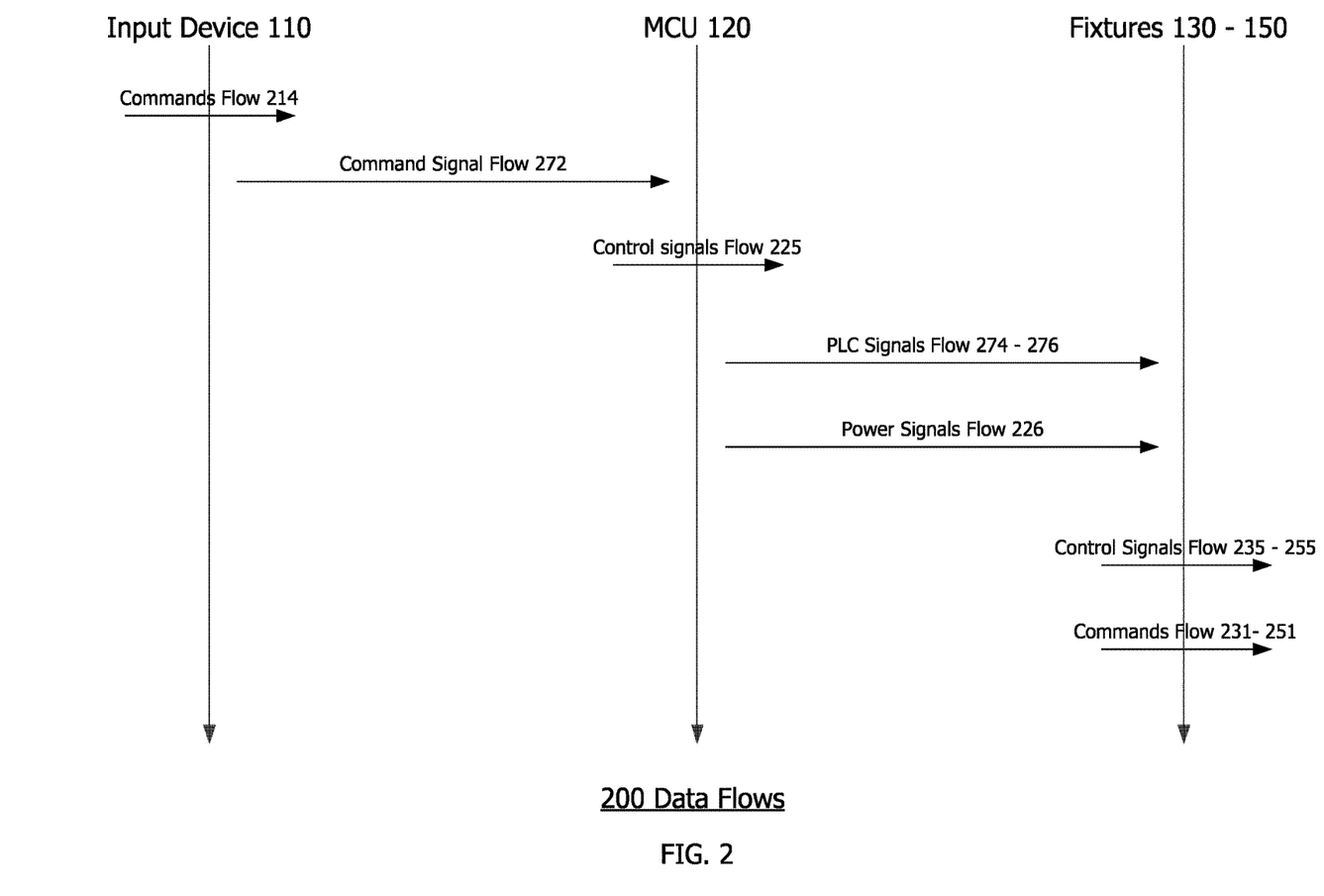
FIG. 2 show data flows for sending wireless lighting fixture control signals to lighting fixtures using PLC signals.

FIG. 2 show data flows 200 for sending wireless lighting fixture control signals 274-276 to lighting fixtures using PLC signals. Data flows 200 may be created by and/or caused by system 100 as noted. Data flows 200 include commands flow 214 at input device 110 that is receiving an input at device 110 of command signals 114 having a number of lighting fixture commands for the number of lighting fixtures, such as described at step 320 of FIG. 3A. Next, flows 200 include command signals flow 272 from device 110 to MCU 120 of command signals 172 having command signals 114, such as described at steps 320-330 of FIG. 3A.

Figure 3A:
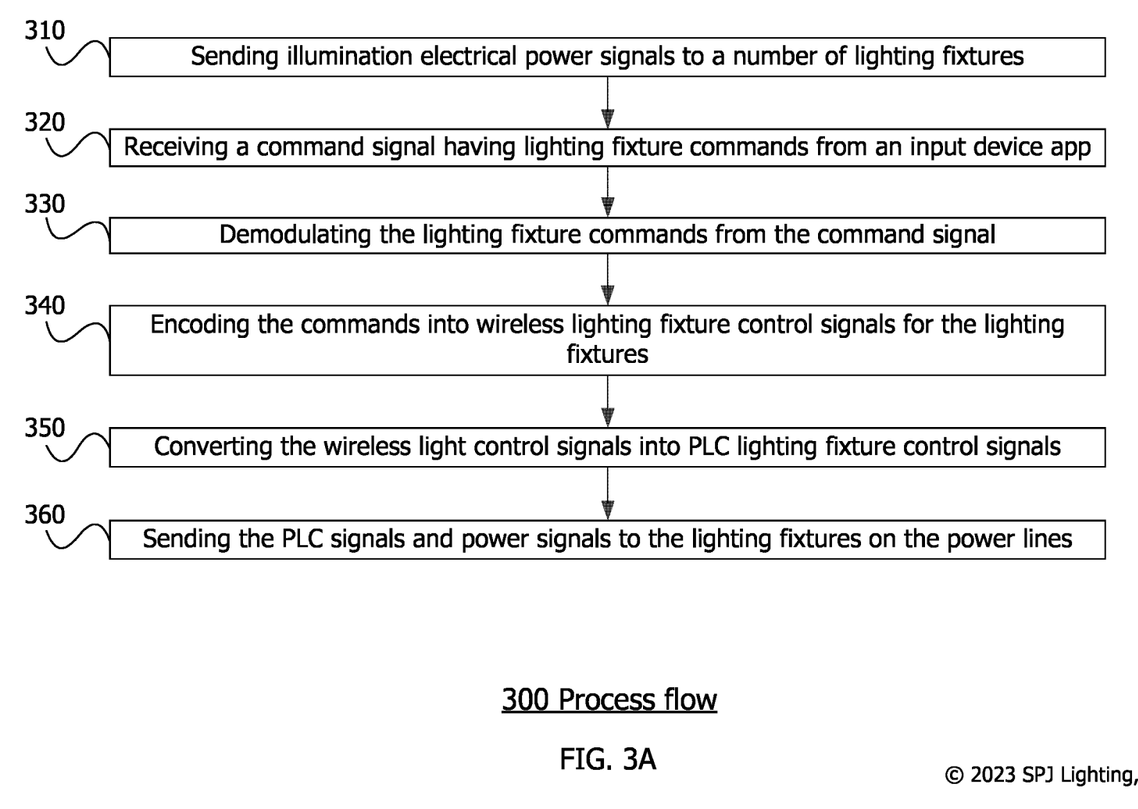
FIG. 3A shows a flow chart of an operating environment or process flow for sending wireless lighting fixture control signals to lighting fixtures using PLC signals.

Then, flows 200 include wireless control signals flow 225 at MCU 120 that is the wireless protocol encoding of signals 114 to create wireless encoded signals 125, such as described at step 340 of FIG. 3A. Now, flows 200 include PLC signals flow 274-276 from MCU 120 to fixtures 130-150 that is the PLC signals 174-176 being modulated by and transmitted on power lines 164-166 with power signals 126 from MCU 120 to fixtures 130-150, such as described at steps 350-360 of FIG. 3A. Flows 200 include power signals flow 226 that is power signals 126 being sent from MCU 120 to fixtures 130-150 on power lines 164-166 along with the PLC signals 274-276, such as described at step 360 of FIG. 3A.

Figure 3B:
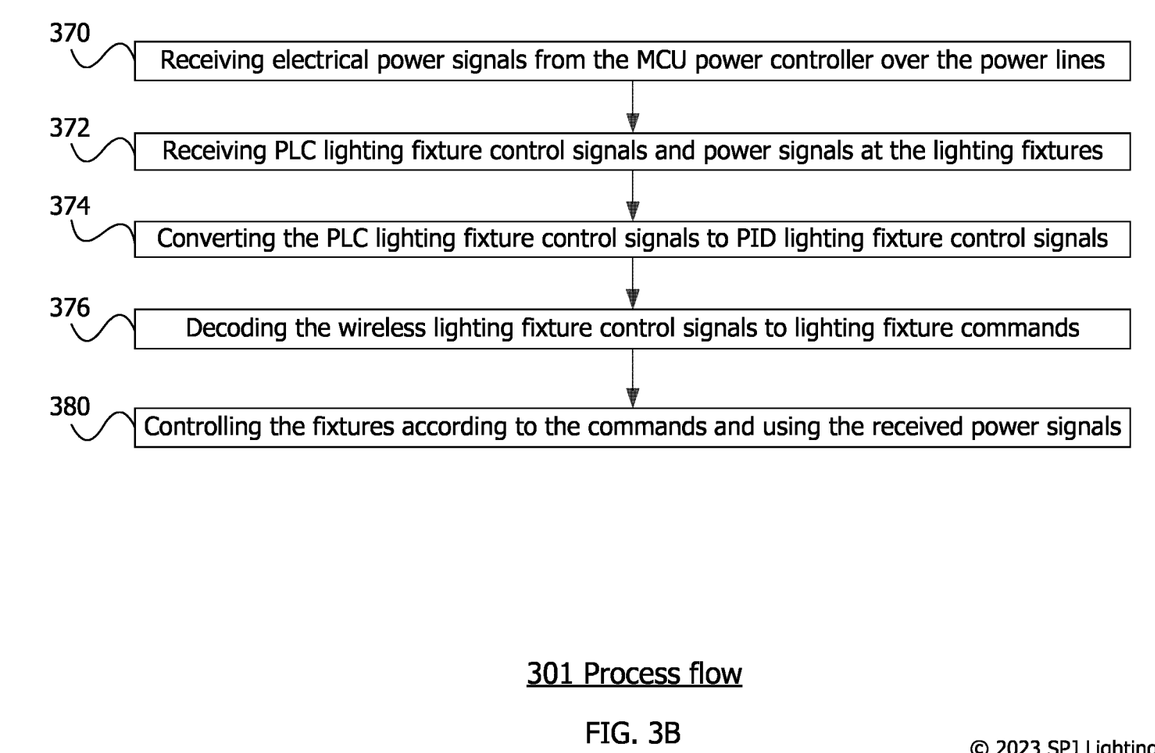
FIG. 3B shows a flow chart of an operating environment or a process flow 301 for lighting fixtures using PLC signals having wireless lighting fixture control signals to illuminate a scene.

Then, flows 200 include wireless control signals flow 235-255 at fixtures 130-150 that is the PLC demodulating of signals 174-176 to create wireless signals 125 or to create wireless signals 135-155, such as described at steps 370-374 of FIG. 3B. Finally, flows 200 include commands flow 231-251 at fixtures 130-150 that is the wireless decoding of wireless signals 125 or wireless signals 135-155 to create commands 131-151, such as described at steps 376-378 of FIG. 3B.

Description of Processes

FIG. 3A shows a flow chart of an operating environment or a process flow 300 for the MCU 120 sending wireless lighting fixture control signals to lighting fixtures using PLC signals. The process 300 may be performed by one or more of system 100 and/or MCU 120. The process 300 starts at step 310 and can end at step 360, but the process can also be cyclical by returning to step 310 after step 360. For example, the process may return to be performed multiple times to change over time, or in response to user input of new commands, the signals 174-176 being sent to fixtures 130-150.

Step 310 is sending illumination electrical power signals 126 to a number of fixture power controllers 138-158 of a number of lighting fixtures 130-150 through the number of power lines 164-166. Step 310 may be performed by controller 128 and/or transmitter 129.

Step 320 is receiving modulated command signal 172 from an input device application 112, the command signal 172 having a number of lighting fixture commands 114 for the number of lighting fixtures 130-150. Step 320 may be performed by receiver 122 and/or demodulator 123.

Step 330 is demodulating the number of lighting fixture commands 114 from the command signal 172. Step 330 may be performed by demodulator 123 and may create commands 114 at MCU 120.

Step 340 is encoding the commands 114 into wireless lighting fixture control signals 125 for each of the number of lighting fixtures 130-150. Step 340 may be performed by wireless encoder 124 to create wireless signals 125 having wireless signals 135-155 for fixtures 130-150.

Step 350 is converting the wireless light control signals 125 into a number of power line control (PLC) lighting fixture control signals 174-176 for sending to each of the number of lighting fixtures 130-150. Step 350 may be performed by PLC modulator 127 to create signals 174-176 having PLC modulated versions of wireless signals 135-155 for fixtures 130-150.

Step 360 is sending at least one of the number of PLC lighting fixture control signals 174-176 and one of the illumination electrical power signals 126 to each of the number of lighting fixtures 130-150 using the number of power lines 164-166. Step 360 may be sending the plurality of PLC lighting fixture control signals 174-176 and one of the illumination electrical power signals 125 (or one of signal 136-156) to at least two of the lighting fixtures using the power lines. Step 360 may be performed by power and PLC transmitter 129.

FIG. 3B shows a flow chart of an operating environment or a process flow 301 for lighting fixtures 130-150 using PLC signals having wireless lighting fixture control signals to illuminate a scene.

The process 301 may be performed by one or more of fixtures 130-150. The process 301 starts at step 370 and can end at step 380, but the process can also be cyclical by returning to step 370 after step 380. For example, the process may return to be performed multiple times to change over time the commands 131-151 being used to control lights 132-152.

Step 370 is receiving illumination electrical power signals 174-176 from the MCU power controller 128 over power lines 164-166. Step 370 may be performed by receivers 139-159 receiving signal 174-176 from transmitter 129.

Next, step 372 is receiving at least one of the PLC lighting fixture control signals 174-176 and one of the illumination electrical power signals 126 sent by the power and PLC transmitter 129 to each of the number of lighting fixtures using the number of power lines 164-166. Step 370 may be performed by receivers 139-159 receiving signals 126 from transmitter 129.

Next, step 374 is converting the PLC lighting fixture control signals 174-176 to one of the number of wireless lighting fixture control signals 135-155. Step 374 may be performed by PLC demodulators 137-157 demodulating signals 174-176 to create wireless signals 135-155 for fixtures 130-150.

Next, step 376 is decoding the wireless lighting fixture control signals 135-155 to one of the number of lighting fixture commands 131-151. Step 376 may be performed by wireless decoders 134-154 decoding the wireless signals 135-155 to create commands 131-151 for fixtures 130-150.

Step 380 is controlling at least one light 132-152 of the fixtures according to the lighting fixture commands 131-151 and using the received illumination electrical power signals 126. Step 380 may be performed by fixture controllers 133-153 using commands 131-151 and signals 126 for each of fixtures 130-150.

Figure 4:
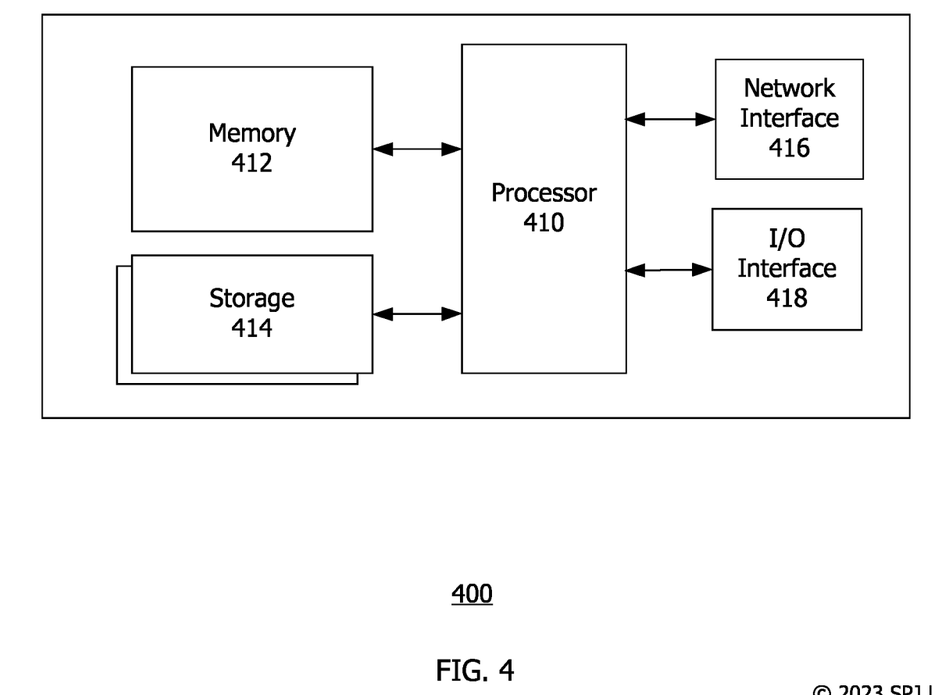
FIG. 4 is a block diagram of a computing device.

FIG. 4 is a block diagram of a computing device 400. The computing device 400 may be representative of the device 110, MCU 120 and/or any of fixtures 130-150. The computing device 400 may be a desktop or laptop computer, a server computer, a client computer, a network router, a network switch, a network node, a tablet, a smartphone or other mobile device. The computing device 400 may include software and/or hardware for providing functionality and features described herein, such as for sending, receiving and/or using wireless lighting fixture control signals sent to lighting fixtures using PLC signals. The computing device 400 may therefore include one or more of: logic arrays, memories, analog circuits, digital circuits, software, firmware and processors. The hardware and firmware components of the computing device 400 may include various specialized units, circuits, software and interfaces for providing the functionality and features described herein. For example, the components of system 100 may perform sending, receiving and/or using wireless lighting fixture control signals sent to lighting fixtures 130-150 using PLC signals 174-176.

The computing device 400 has a processor 410 coupled to a memory 412, storage 414, a network interface 416 and an I/O interface 418. The processor 410 may be or include one or more microprocessors, field programmable gate arrays (FPGAs), application specific integrated circuits (ASICs), programmable logic devices (PLDs) and programmable logic arrays (PLAs).

The memory 412 may be or include RAM, ROM, DRAM, SRAM and MRAM, and may include firmware, such as static data or fixed instructions, BIOS, system functions, configuration data, and other routines used during the operation of the computing device 400 and processor 410. The memory 412 also provides a storage area for data and instructions associated with applications and data handled by the processor 410. As used herein the term "memory" corresponds to the memory 412 and explicitly excludes transitory media such as signals or waveforms.

The storage 414 provides non-volatile, bulk or long-term storage of data or instructions in the computing device 400. The storage 414 may take the form of a magnetic or solid state disk, tape, CD, DVD, or other reasonably high capacity addressable or serial storage medium. Multiple storage devices may be provided or available to the computing device 400. Some of these storage devices may be external to the computing device 400, such as network storage or cloud-based storage. As used herein, the terms "storage" and "storage medium" correspond to the storage 414 and explicitly exclude transitory media such as signals or waveforms. In some cases, such as those involving solid state memory devices, the memory 412 and storage 414 may be a single device.

The network interface 416 includes an interface to a network such as a network that can be used to communicate network packets, network messages, telephone calls, faxes, wireless signals and/or wired power signals as described herein. The network interface 416 may be wired and/or wireless.

The I/O interface 418 interfaces the processor 410 to peripherals (not shown) such as displays, video and still cameras, microphones, user input devices (e.g., touchscreens, mice, keyboards and the like) and USB devices. In some cases, the I/O interface 418 includes the peripherals, such as displays, GUIs and user input devices, for being accessed by the user to input commands 114 at application 112.

In some cases, storage 414 is a non-volatile or a non-transitory machine-readable storage medium that includes all types of computer readable media, including magnetic storage media, optical storage media, and solid state storage media. It should be understood that the software can be installed in and sold with the application 112, MCU 120 and/or fixtures 130-150. Alternatively, the software can be obtained and loaded into the application 112, MCU 120 and/or fixtures 130-150, including obtaining the software via a disc medium or from any manner of network or distribution system, including from a server owned by the software creator or from a server not owned but used by the software creator. The software can be stored on a server for distribution over the Internet.

The techniques herein for sending, receiving and/or using wireless lighting fixture control signals sent to lighting fixtures 130-150 using PLC signals 174-176 may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

Sending, receiving and/or using wireless lighting fixture control signals sent to lighting fixtures 130-150 using PLC signals 174-176 negates the need for a wireless antenna on the fixtures and/or an RF chip at the fixtures 130-150. In some cases, the fixtures do not have a wireless chip, they utilize a wireless decoder 134-154 and/or PLC demodulator 137-157 to manipulate the LED light output by lights 132-152. Using PLC signals 174-176 negates the need for the fixtures to have wireless signal receivers or transparent windows (e.g., plastic or glass) in their housing which reduces the need for that additional equipment and reduces the chance for moisture or water to leak into the fixture through the windows. The windows may also not be aesthetically attractive, such as when the window requires a certain shape of or feature on the outside housing of the fixture. Not having the windows presents fewer problems, such as to manufacture and seal from moisture or water. For metal, alloy or brass housed landscape fixtures (which have housings that block RF, Wi-Fi and/or blue tooth signals) adding a plastic window through which to receive the RF, Wi-Fi and/or Blue tooth signal is difficult to manufacture, may not be waterproof and may not be aesthetically attractive.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A master control unit (MCU) adapted to send wireless lighting fixture control signals to lighting fixtures using wired power line control (PLC) signals, the MCU comprising electronic circuitry including:
    an MCU power controller coupled through a plurality of power lines to a plurality of fixtures, the plurality of power lines for sending illumination electrical power signals to a plurality of fixture power controllers of the plurality of lighting fixtures;
    a command receiver for receiving a modulated command signal from an input device, the modulated command signal including a plurality of lighting fixture commands for the plurality of lighting fixtures;

a demodulator for demodulating the modulated command signal to obtain the plurality of lighting fixture commands from the modulated command signal;

a wireless encoder for encoding each of the plurality of lighting fixture commands into at least one wireless lighting fixture control signal for each of at least two of the plurality of lighting fixtures;

a PLC modulator for converting the at least one wireless lighting fixture control signal for each of the at least two of the plurality of lighting fixtures into a plurality of wired PLC lighting fixture control signals for sending to the at least two of the plurality of lighting fixtures;

wherein converting the at least one wireless light fixture control signals includes modulating a carrier signal with the wireless lighting fixture control signals to create the plurality of wired PLC signals, wherein the carrier signal has a carrier frequency that is between 10× and 1E6× a frequency of the at least one wireless lighting fixture control signals; and a power and PLC transmitter for sending the plurality of PLC lighting fixture control signals and one of the illumination electrical power signals to each of the at least two of the plurality of lighting fixtures using the plurality of power lines, wherein each of the plurality of PLC lighting fixture control signal has a distinct encoding for each of the plurality of lighting fixtures.

2. The MCU of claim 1, wherein the command receiver is a wireless receiver, the modulated command signal is a wireless signal, the input device is a mobile application sending the modulated command signal, and the wireless signal is sent by one of: radio frequency (RF) signals, Wi-Fi signals, Bluetooth signals, and/or 900 MHz signals.

3. The MCU of claim 1, further comprising a plurality of lighting fixtures adapted to use a plurality of PLC lighting fixture control signals to illuminate a scene, each of the plurality of lighting fixtures comprising electronic circuitry including:

a fixture power controller coupled to the plurality of power lines for receiving the illumination electrical power signals from the MCU power controller;

a fixture power and PLC receiver for receiving at least one of the plurality of PLC lighting fixture control signals and one of the illumination electrical power signals sent by the power and PLC transmitter to each of the plurality of lighting fixtures using the plurality of power lines;

a PLC demodulator for converting the at least one of the plurality of PLC lighting fixture control signals to one of the plurality of wireless lighting fixture control signals;

a wireless decoder for decoding the one of the plurality of wireless lighting fixture control signals to one of the plurality of lighting fixture commands; and a fixture controller for controlling at least one light of the fixture according to the one of the plurality of lighting fixture commands and using the received illumination electrical power signal.

4. The MCU of claim 1, further comprising the at least one light of the fixture for illuminating a scene according to the control of the fixture controller.

5. The MCU of claim 1, wherein the plurality of lighting fixtures are between 10 and 200 landscape system lighting fixtures; wherein the commands are brightness commands and color commands; and wherein the at least one light of the fixture includes an LED driver and at least one LED for illuminating a landscape based on the LED driver.

6. The MCU of claim 1, wherein sending the plurality of PLC lighting fixture control signals includes one of:
a) the PLC transmitter sending all of the plurality of PLC lighting fixture control signals each with all of the plurality of wireless lighting fixture control signals to each of the plurality of lighting fixtures using a separate one of the plurality of wired power lines;
b) the PLC transmitter sending one of the plurality of PLC lighting fixture control signals with all of the plurality of wireless lighting fixture control signals to each of the plurality of lighting fixtures using a separate one of the plurality of wired power lines;
c) the PLC transmitter sending all of the plurality of PLC lighting fixture control signals each with one of the plurality of wireless lighting fixture control signals to each of the plurality of lighting fixtures using a separate one of the plurality of wired power lines; or
d) the PLC transmitter sending one of the plurality of PLC lighting fixture control signals with one of the plurality of wireless lighting fixture control signals to each of the plurality of lighting fixtures using a separate one of the plurality of wired power lines.

7. The MCU of claim 1,
wherein the MCU electronic circuitry includes hardware logic circuitry for automatically and simultaneously transmitting the PLC signals and the illumination power signals to the plurality of fixtures over the wired power lines, and
wherein the plurality of power lines form a daisy chain connection from the MCU to a first of the plurality of fixtures, and from the first of the plurality of fixtures to a second of the plurality of fixtures.

8. The MCU of claim 1, wherein the input device has a graphical user interface (GUI) that allows a user to input the lighting fixture commands and to input an integer that represents a count of the plurality of light fixtures; and
wherein the input device includes:
a modulator for modulating a carrier signal with the commands to form a wireless signal; and
a wireless transmitter and one or more of an RF chip, an RF antenna and/or an RF transparent window for transmitting the wireless signal from the input device to the MCU wireless receiver.

9. The MCU of claim 1,
wherein each of the plurality of PLC lighting fixture control signal has the distinct encoding but not a distinct modulation for each of the plurality of lighting fixtures.

10. A plurality of lighting fixtures adapted to use a plurality of wired power line control (PLC) lighting fixture control signals to illuminate a scene, each of the plurality of lighting fixtures comprising electronic circuitry including:

a fixture power controller coupled through a power line to a master control unit (MCU), the power line for receiving illumination electrical power signals from an MCU power controller of the MCU;

a fixture power and PLC receiver for receiving at least one of the plurality of PLC lighting fixture control signals and one of the illumination electrical power signal sent by a power and PLC transmitter of the MCU to each of the plurality of lighting fixtures using the plurality of power lines;

a PLC demodulator for converting the at least one of the plurality of PLC lighting fixture control signals to one of a plurality of wireless lighting fixture control signals;

wherein the at least one of the plurality of PLC lighting fixture control signals includes a carrier signal modulated with one of a plurality of wireless lighting fixture control signals, wherein the carrier signal has a carrier frequency that is between 10× and 1E6× a frequency of the one of a plurality of wireless lighting fixture control signals;

a wireless decoder for decoding the one of the plurality of wireless lighting fixture control signals to one of a plurality of lighting fixture commands; and a fixture controller for controlling at least one light of the fixture according to the one of the plurality of lighting fixture commands and using the received illumination electrical power signal, wherein each of the plurality of PLC lighting fixture control signal has a distinct encoding for each of the plurality of lighting fixtures.

11. The plurality of lighting fixtures of claim 10, further comprising the at least one light for illuminating a scene according to the control of the fixture controller.

12. The plurality of lighting fixtures of claim 10, wherein the plurality of lighting fixtures are between 10 and 200 landscape system lighting fixtures; wherein the commands are brightness commands and color commands; and wherein the at least one light includes an LED driver and at least one LED for illuminating a landscape based on the LED driver.

13. The plurality of lighting fixtures of claim 10, wherein sending the plurality of PLC lighting fixture control signals includes one of:
a) each of the plurality of light fixtures receiving all of the plurality of PLC lighting fixture control signals each with all of the plurality of wireless lighting fixture control signals over a separate one of the plurality of wired power lines;
b) each of the plurality of light fixtures receiving one of the plurality of PLC lighting fixture control signals with all of the plurality of wireless lighting fixture control signals over a separate one of the plurality of wired power lines;
c) each of the plurality of light fixtures receiving all of the plurality of PLC lighting fixture control signals each with one of the plurality of wireless lighting fixture control signals over a separate one of the plurality of wired power lines; or
d) each of the plurality of light fixtures receiving one of the plurality of PLC lighting fixture control signals with one of the plurality of wireless lighting fixture control signals over a separate one of the plurality of wired power lines.

14. A method for sending wireless lighting fixture control signals to a plurality of lighting fixtures using a plurality of PLC signals, the method comprising:
sending illumination electrical power signals to a plurality of fixture power controllers of the plurality of lighting fixtures through a plurality of wired power lines;
receiving a modulated command signal from an input device, the modulated command signal having a plurality of lighting fixture commands for the plurality of lighting fixtures;
demodulating the plurality of lighting fixture commands from the modulated command signal;
encoding each of the plurality of lighting fixture commands into at least one wireless lighting fixture control signal for each of at least two of the plurality of lighting fixtures;
converting the at least one wireless lighting fixture control signal for each of the at least two of the plurality of lighting fixtures into a plurality of wired power line control (PLC) lighting fixture control signals for sending to the at least two of the plurality of lighting fixtures;

wherein converting the wireless light fixture control signals includes modulating a carrier signal with the wireless lighting fixture control signals to create the plurality of wired PLC signals, wherein the carrier signal has a carrier frequency that is between 10× and 1E6× a frequency of the wireless lighting fixture control signals; and sending the plurality of PLC lighting fixture control signals and one of the illumination electrical power signals to each of the at least two of the plurality of lighting fixtures using the plurality of power lines, wherein each of the plurality of PLC lighting fixture control signal has a distinct encoding for each of the plurality of lighting fixtures.

15. The method of claim 14, wherein the command receiver is a wireless receiver, the modulated command signal is a wireless signal, the input device is a mobile application sending the modulated command signal, and the wireless signal is sent by one of: radio frequency (RF) signals, Wi-Fi signals, Bluetooth signals, and/or 900 MHz signals.

16. The method of claim 14, further comprising:
receiving illumination electrical power signals from the MCU power controller over one of the plurality of power lines;
receiving at least one of the plurality of PLC lighting fixture control signals and one of the illumination electrical power signals sent by the power and PLC transmitter to each of the plurality of lighting fixtures using the plurality of power lines;
converting the at least one of the plurality of PLC lighting fixture control signals to one of the plurality of wireless lighting fixture control signals;
decoding the one of the plurality of wireless lighting fixture control signals to one of the plurality of lighting fixture commands; and
controlling at least one light of the fixture according to the one of the plurality of lighting fixture commands and using the received illumination electrical power signal.

17. The method of claim 14, further comprising illuminating a scene according to the control of the fixture controller.

18. The method of claim 14, wherein the plurality of lighting fixtures are between 10 and 200 landscape system lighting fixtures; wherein the commands are brightness commands and color commands; and wherein the at least one light includes an LED driver and at least one LED for illuminating a landscape based on the LED driver.

19. The method of claim 14, wherein sending the plurality of PLC lighting fixture control signals includes one of:
a) the PLC transmitter sending all of the plurality of PLC lighting fixture control signals each with all of the plurality of wireless lighting fixture control signals to each of the plurality of lighting fixtures using a separate one of the plurality of power lines;
b) the PLC transmitter sending one of the plurality of PLC lighting fixture control signals with all of the plurality of wireless lighting fixture control signals to each of the plurality of lighting fixtures using a separate one of the plurality of wired power lines;
c) the PLC transmitter sending all of the plurality of PLC lighting fixture control signals each with one of the plurality of wireless lighting fixture control signals to each of the plurality of lighting fixtures using a separate one of the plurality of wired power lines; or
d) the PLC transmitter sending one of the plurality of PLC lighting fixture control signals with one of the plurality of wireless lighting fixture control signals to each of the plurality of lighting fixtures using a separate one of the plurality of wired power lines.

20. The method of claim 14, wherein sending the plurality of PLC lighting fixture control signals includes automatically and simultaneously transmitting the PLC signals and the illumination power signals to the plurality of fixtures over the power lines.

\* \* \* \* \*